United States Patent
Kim et al.

(10) Patent No.: US 11,434,789 B2
(45) Date of Patent: Sep. 6, 2022

(54) OIL TEMPERATURE INCREASING SYSTEM AND METHOD FOR ECO-FRIENDLY VEHICLE

(71) Applicants: HYUNDAI MOTOR COMPANY, Seoul (KR); KIA MOTORS CORPORATION, Seoul (KR)

(72) Inventors: Jin Ho Kim, Incheon (KR); Jae Hoon Lee, Seoul (KR); Dae Woong Han, Anyang-si (KR); Jeong Bin Yim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/038,915

(22) Filed: Sep. 30, 2020

(65) Prior Publication Data
US 2021/0348530 A1 Nov. 11, 2021

(30) Foreign Application Priority Data
May 7, 2020 (KR) .................... 10-2020-0054183

(51) Int. Cl.
*F01M 5/00* (2006.01)
*B60R 17/02* (2006.01)

(52) U.S. Cl.
CPC ............. *F01M 5/005* (2013.01); *B60R 17/02* (2013.01); *F01M 5/001* (2013.01); *F01M 2250/60* (2013.01)

(58) Field of Classification Search
CPC ........... F04B 17/03; F04D 29/58; F01M 1/02; F01M 2001/0215; B60K 17/16; B60K 1/00; B60K 2001/008; F16H 57/0413; F16H 57/0476; Y02T 10/7258
See application file for complete search history.

(56) References Cited

U.S. PATENT DOCUMENTS

| | | | |
|---|---|---|---|
| 10,876,618 B2 * | 12/2020 | Lasch | ........................ B60K 1/00 |
| 2008/0135314 A1 * | 6/2008 | Motoike | ............... B60W 10/08 180/65.265 |
| 2008/0309264 A1 * | 12/2008 | Izumi | ........................ B60L 7/16 318/376 |
| 2011/0095717 A1 * | 4/2011 | Takizawa | .............. B60L 3/0061 318/473 |

(Continued)

FOREIGN PATENT DOCUMENTS

JP 2016178842 A * 10/2016
JP 6070849 B2 * 2/2017 ........... G01K 15/007

*Primary Examiner* — George C Jin
*Assistant Examiner* — Teuta B Holbrook
(74) *Attorney, Agent, or Firm* — Morgan, Lewis & Bockius LLP

(57) ABSTRACT

An oil temperature increasing system and method for an eco-friendly vehicle includes: an oil-temperature detector configured to detect a temperature of oil flowing to a motor and a transmission by an electric oil pump; and a controller configured to receive a detection signal of the oil-temperature detector, and apply a current for increasing temperature to the motor when the oil temperature is less than a predetermined reference temperature. A temperature of the motor is increased by the current applied to the motor, such that the oil temperature is increased by heat of the motor.

7 Claims, 3 Drawing Sheets

(56) References Cited

U.S. PATENT DOCUMENTS

| | | | |
|---|---|---|---|
| 2014/0225538 A1* | 8/2014 | Omata | H02P 21/34 |
| | | | 318/400.02 |
| 2015/0155795 A1* | 6/2015 | Hirsch | H02M 7/48 |
| | | | 318/400.26 |
| 2016/0352280 A1* | 12/2016 | Miyamoto | H02P 29/66 |
| 2018/0083566 A1* | 3/2018 | Lim | H02P 29/64 |
| 2018/0205339 A1* | 7/2018 | Xiang | H02P 23/0004 |
| 2019/0048990 A1* | 2/2019 | Lasch | F16H 57/0476 |

\* cited by examiner

[FIG.1] -PRIOR ART-
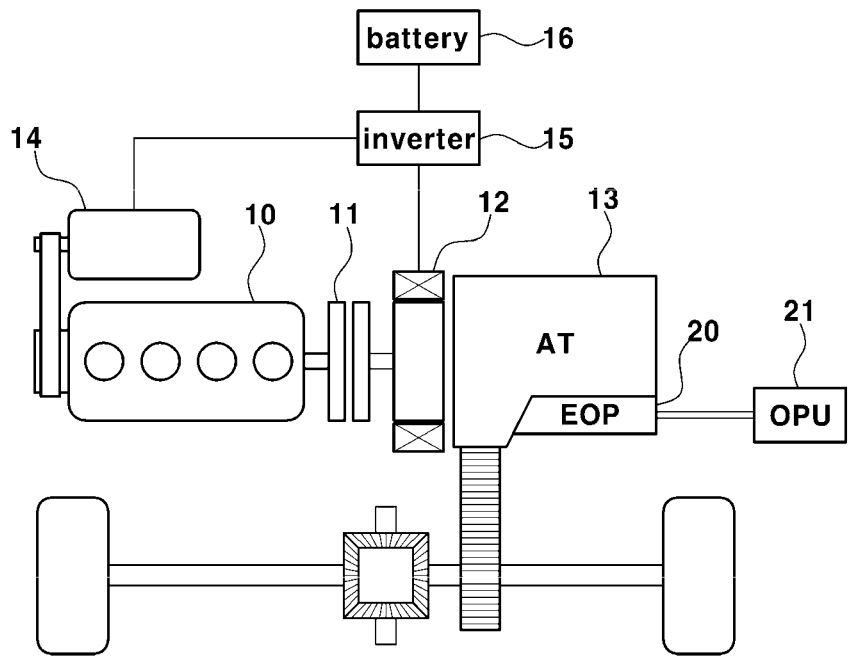
[FIG.2]
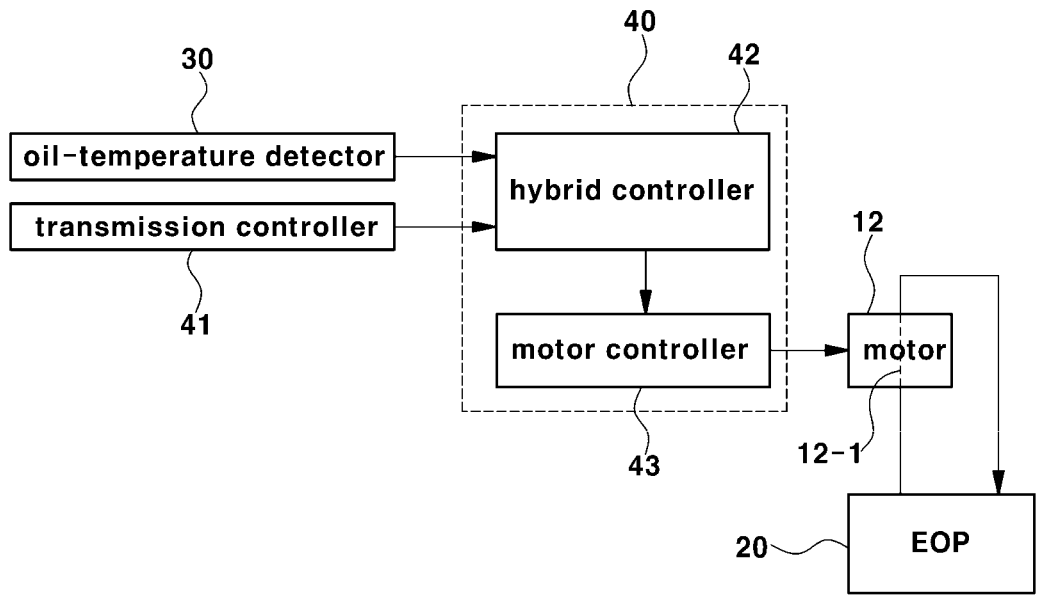

[FIG.3]
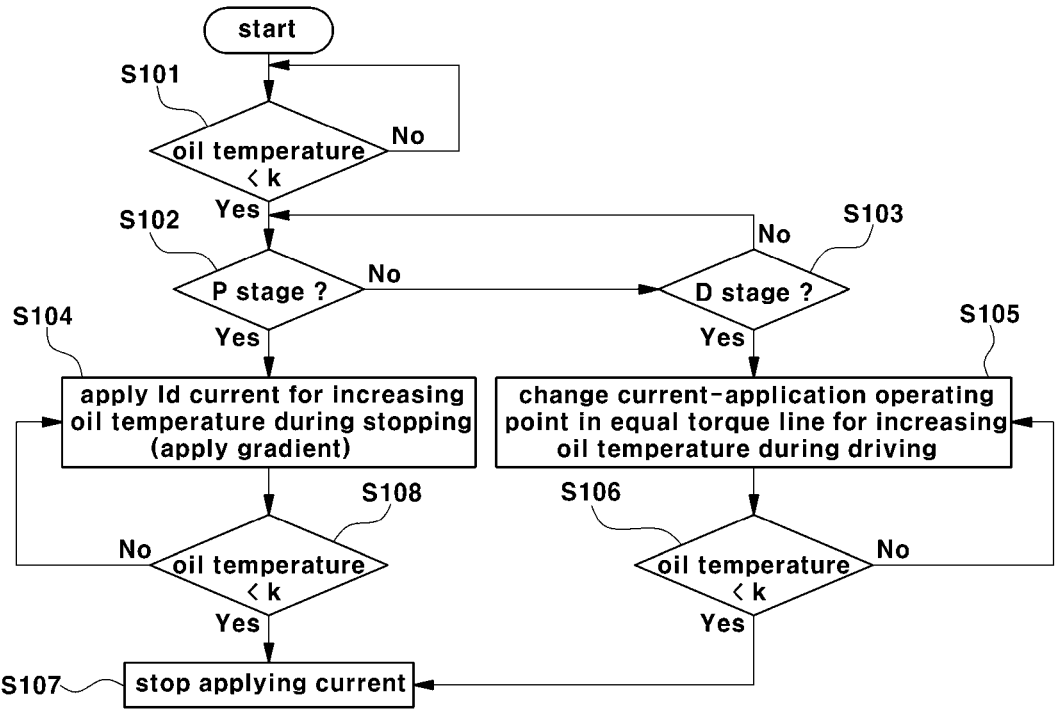
[FIG.4]
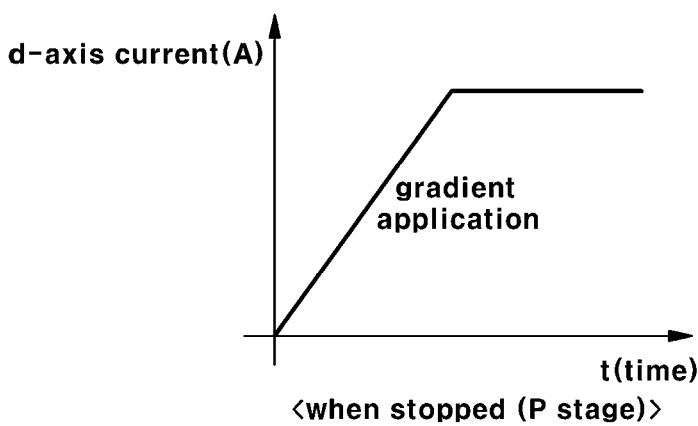
⟨when stopped (P stage)⟩

[FIG.5]
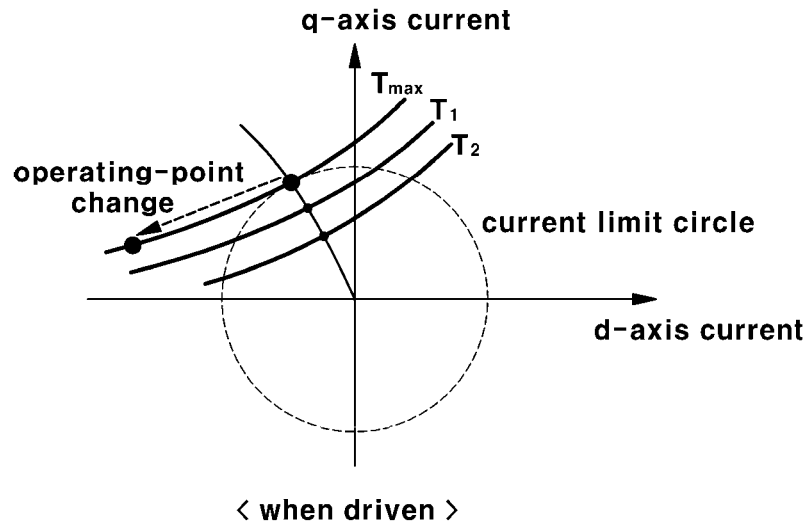
< when driven >
[FIG.6]
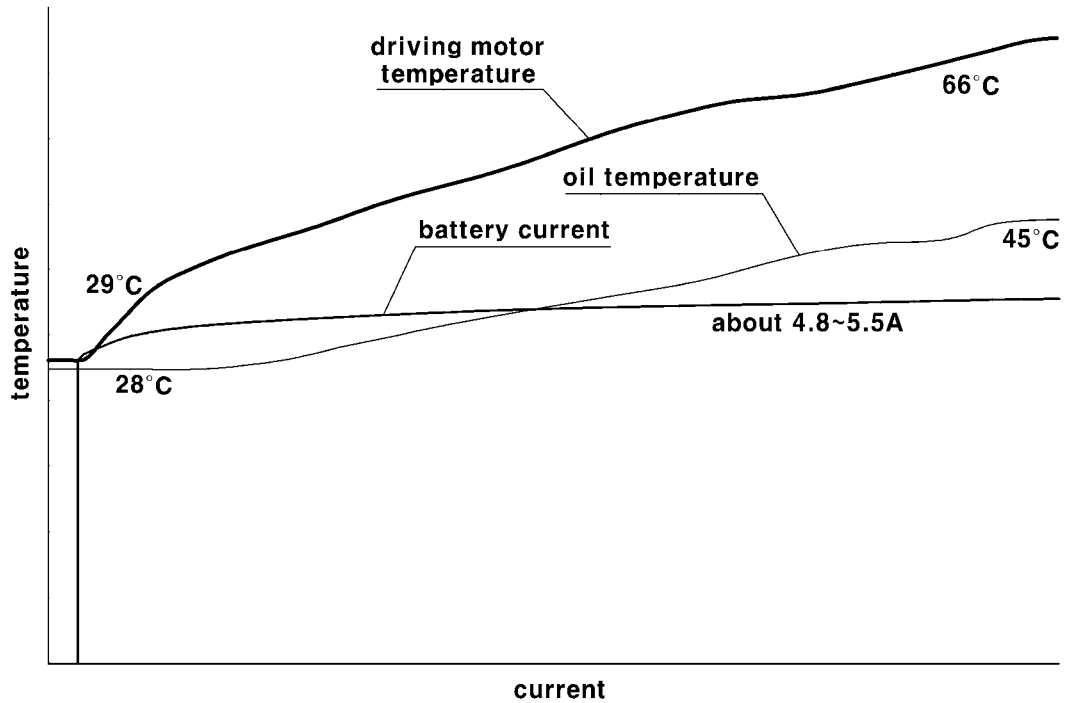

OIL TEMPERATURE INCREASING SYSTEM AND METHOD FOR ECO-FRIENDLY VEHICLE

CROSS REFERENCE TO RELATED APPLICATION

The present application claims the benefit of priority to Korean Patent Application No. 10-2020-0054183, filed May 7, 2020 in the Korean Intellectual Property Office, the entire contents of which are incorporated herein for all purposes by this reference.

TECHNICAL FIELD

The present disclosure relates to an oil temperature increasing system and method for an eco-friendly vehicle. More particularly, the present disclosure relates to a cooling-oil temperature increasing system and method for an eco-friendly vehicle, capable of applying a temperature-increasing current to a motor in a low-temperature environment so as to increase the temperature of the motor, and simultaneously, capable of increasing the temperature of oil flowing through an oil circulation passage of the motor so as to maintain the viscosity of the oil constant.

BACKGROUND

Hybrid vehicles, electric vehicles, hydrogen fuel cell vehicles, etc. are equipped with electric motors as driving sources. These vehicles are referred to as eco-friendly vehicles or electrically-driven vehicles.

Generally, an internal-combustion engine vehicle equipped with a gasoline or diesel engine is provided with a mechanical oil pump operated using the driving force of the engine that is always driven when the vehicle runs. However, an engine included in a power train of the hybrid vehicle is not always driven, and the electric vehicle and the fuel cell vehicle have no engine, so that the eco-friendly vehicle such as the hybrid vehicle, the electric vehicle, and the fuel cell vehicle are equipped with an electric oil pump.

Referring to FIG. 1, a power train of a hybrid vehicle includes an engine 10 and a motor 12 that are arranged in series, an engine clutch 11 that is arranged between the engine 10 and the motor 12 to transmit or interrupt the power of the engine, a transmission 13 that shifts and outputs the power of the motor or both the motor and the engine to a driving wheel, a hybrid starter generator (HSG) 14 that is a kind of a motor connected to a crank pulley of the engine to generate power for starting the engine and charging a battery, an inverter 15 that controls the charging/discharging of the motor 12 and the power generation of the HSG 14, and a high voltage battery 16 that is connected to the motor 12 and the HSG 14 via the inverter 15 to allow charging and discharging.

Furthermore, an electric oil pump (EOP) 20 is mounted on a predetermined position of a transmission housing that covers the transmission 13 to be driven under the control of an oil pump control unit (OPU) 21. The electric oil pump 20 is applied to the electric vehicle and the fuel cell vehicle using the motor as the driving source as well as the hybrid vehicle.

Here, although not shown in the drawings, a cooling-oil circulation path is formed in the motor 12 and the transmission 13.

Therefore, as the oil for cooling and lubrication flows along the oil circulation path of the motor 12 and the transmission 13 by operating the electric oil pump 20, the motor 12 and the transmission 13 are cooled.

For reference, the oil circulated by operating the electric oil pump 20 may be used to cool the motor and the transmission and lubricate the transmission, in addition to applying control hydraulic pressure for shifting.

The viscosity of the oil circulated by operating the electric oil pump 20 is increased in an extremely low temperature environment (e.g. −40° C.). In order to circulate the oil of the increased viscosity, it is necessary to further increase the output of the electric oil pump.

In order to circulate the oil having the increased viscosity in an extremely low temperature environment (e.g. −40° C.), an additional increase in output of the electric oil pump is required. However, since the electric oil pump mounted on the vehicle has a fixed output according to the standard Liter Per Minute (LPM) specification, there is a limit to increase the output for circulating the high-viscosity oil.

Furthermore, as a method for easily circulating the high-viscosity oil, the electric oil pump may be replaced with a specification having an increased output capacity. However, this is problematic in that packaging assemblability may be deteriorated due to an increase in size of the electric oil pump, and cost may be greatly increased.

The foregoing is intended merely to aid in the understanding of the background of the present disclosure, and is not intended to mean that the present disclosure falls within the purview of the related art that is already known to those skilled in the art.

SUMMARY

The present disclosure has been made in order to solve the above-mentioned problems in the related art and an objective of the present disclosure is intended to provide an oil temperature increasing system and method for an eco-friendly vehicle, in which, when an oil temperature is less than a predetermined reference temperature, a temperature-increasing current is applied to a motor, thus increasing the temperature of the motor, and simultaneously increasing the temperature of the oil flowing through an oil circulation passage of the motor, and consequently maintaining the viscosity of the oil so that the oil can be easily circulated by an electric oil pump.

In order to achieve the objective of the present disclosure, according to an aspect of the present disclosure, an oil temperature increasing system for an eco-friendly vehicle includes: an oil-temperature detector configured to detect a temperature of oil flowing to a motor and a transmission by an electric oil pump; and a controller configured to receive a detection signal of the oil-temperature detector, and to apply a current for increasing temperature to the motor, when the oil temperature is less than a predetermined reference temperature, wherein a temperature of the motor may be increased by the current applied to the motor, such that the oil temperature may be increased by heat of the motor.

The controller may be configured to apply a d-axis current as the temperature-increasing current to the motor, when a shift stage of the vehicle is a P stage.

The controller may apply the current to reach a maximum d-axis current value with a predetermined gradient for a predetermined period of time, when the d-axis current for increasing temperature is applied to the motor.

The controller may be configured to apply the temperature-increasing current to the motor and to select an operating point that maximally applies a current in an equal torque line of a current map for driving the motor, when the shift stage of the vehicle is a D stage.

The controller may stop applying the temperature-increasing current to the motor, when it is detected that the oil temperature is equal to or more than a predetermined reference temperature after the temperature-increasing current is applied to the motor.

According to another aspect of the present disclosure, an oil temperature increasing method for an eco-friendly vehicle includes: detecting, by an oil-temperature detector, a temperature of oil flowing to a motor and a transmission by an electric oil pump; and applying, by a controller, a current for increasing temperature to the motor, when a detection signal of the oil-temperature detector is received and the oil temperature is less than a predetermined reference temperature, wherein the temperature of oil is increased by heat of the motor as a temperature of the motor is increased by applying the current to the motor.

The controller may apply a d-axis current as the temperature-increasing current to the motor, when a shift stage of the vehicle is a P stage.

When the d-axis current for increasing temperature is applied to the motor, the current may be applied to reach a maximum d-axis current value with a predetermined gradient for a predetermined period of time.

The controller may change an operating point of the motor into an operating point to which the current is maximally applied, in an equal torque line of a current map for driving the motor, when the shift stage of the vehicle is a D stage.

After the increasing the temperature of the oil, the controller may stop applying the temperature-increasing current to the motor, when it is detected that the oil temperature is equal to or more than a predetermined reference temperature.

Through the above-described objectives, the present disclosure provides the following effects.

First, when stopping or driving under low-temperature environment conditions, a temperature-increasing current is applied to a motor to increase the temperature of the motor, and the heat of the motor caused by the increase in temperature is transferred to the oil flowing through an oil circulation passage of the motor, thus preventing the viscosity of oil from being increased in the low temperature environment, and simultaneously maintaining the viscosity of the oil so that the oil can be easily circulated by an electric oil pump.

Second, a control operation is performed such that only a temperature-increasing current is applied to a motor, without replacing an electric oil pump with a specification having an increased output capacity, thus realizing cost reduction, and an existing electric oil pump can be employed without special modification, thus optimizing packaging assemblability for each vehicle type.

BRIEF DESCRIPTION OF THE DRAWINGS

The above and other objectives, features, and other advantages of the present disclosure will be more clearly understood from the following detailed description when taken in conjoint with the accompanying drawings, in which:

FIG. 1 is a schematic power transmission diagram showing an example of a power train of a hybrid vehicle;

FIG. 2 is a control block diagram showing an oil temperature increasing system for an eco-friendly vehicle according to an exemplary embodiment of the present disclosure;

FIG. 3 is a flowchart showing an oil temperature increasing method for an eco-friendly vehicle according to an exemplary embodiment of the present disclosure;

FIG. 4 is a graph showing a method of applying a temperature-increasing current to a motor so as to increase an oil temperature when the eco-friendly vehicle according to an exemplary embodiment of the present disclosure is stopped;

FIG. 5 is a graph showing a method of applying the temperature-increasing current to the motor so as to increase the oil temperature when the eco-friendly vehicle according to an exemplary embodiment of the present disclosure is driven; and FIG. 6 is a graph showing a test example result for an oil-temperature increase test when the eco-friendly vehicle according to an exemplary embodiment of the present disclosure is stopped.

DETAILED DESCRIPTION

Hereinafter, exemplary embodiments of the present disclosure will be described in detail with reference to the accompanying drawings.

As described above with reference to FIG. 1, the electric oil pump 20 driven under the control of the oil pump control unit 21 is mounted on the predetermined position of the transmission housing that covers the transmission 13, among the components of the power train of the hybrid vehicle, and the oil circulation path for cooling is formed in the motor 12 and the transmission 13.

Thus, as the oil for cooling and lubrication flows along the oil circulation path of the motor 12 and the transmission 13 by operating the electric oil pump 20, the motor 12 and the transmission 13 are cooled.

However, the viscosity of the oil circulated by operating the electric oil pump 20 is increased in an environment having a low temperature that is less than a predetermined reference temperature. In order to circulate the oil of the increased viscosity, it is necessary to further increase the output of the electric oil pump. However, since the output of the electric oil pump has a fixed output according to the standard Liter Per Minute (LPM) specification, there is a limit to increase the output for circulating the high-viscosity oil.

Meanwhile, a driving motor applied to the hybrid vehicle or the electric vehicle mainly uses an interior permanent magnet synchronous motor (IPMSM) configured such that a permanent magnet is embedded in a rotor.

In the case of the interior permanent magnet synchronous motor, the rotating torque of the rotor is generated by interaction between a rotating magnetic field generated by a three-phase current applied to a coil of a stator, and a magnetic field of the permanent magnet of a rotor core.

Here, heat is generated in proportion to the square of the current applied to the coil of the stator.

In consideration of the problems in which there is a limit to increase the output of the electric oil pump to a level for circulating the high-viscosity oil, and the heat is generated by the current applied to the coil of the stator, the disclosure is intended to increase the motor temperature by applying a temperature-increasing current to the motor when a vehicle is stopped and driven under low-temperature environment conditions, and to transfer the heat of the motor caused by the increase in temperature to oil flowing through the oil circulation passage of the motor, thus preventing the viscosity of the oil from being increased in the low temperature environment, and simultaneously maintaining the viscosity of the oil so that the oil can be easily circulated by the electric oil pump.

Referring to FIG. 2, the oil temperature increasing system according to an exemplary embodiment of the present disclosure includes an oil-temperature detector 30 that detects the temperature of the oil circulated to the motor 12 and the transmission 13 by the electric oil pump 20, and a controller 40 that receives the detection signal of the oil-temperature detector 30 and applies the temperature-increasing current to the motor 12 when the temperature of the oil is less than a predetermined reference temperature.

The oil-temperature detector 30 may include an oil temperature sensor that detects the temperature of the oil discharged from the electric oil pump 20 and fed to the motor 12 and the transmission 13.

As shown in FIG. 2, the controller 40 may be composed of a single integrated controller or a plurality of controllers including a hybrid controller 42 that is an uppermost controller to receive a detection signal of the oil-temperature detector 30 and a current shift-stage signal of a transmission controller 41, thus commanding a current for the motor 12, and a motor controller 43 that controls the current for the motor 12 according to the current command of the hybrid controller 42.

Particularly, the controller 40 is configured to receive the detection signal of the oil-temperature detector 30 and the current shift-stage signal of the transmission controller 41, and to apply the temperature-increasing current to the motor 12 when the oil temperature is less than a predetermined reference temperature, and to apply temperature-increasing currents in a P stage (when stopped) and a drive (D) stage (when driven) in different ways.

The controller 40 may be configured to receive the detection signal of the oil-temperature detector 30, thus applying the temperature-increasing current to the motor 12 when the oil temperature is less than the predetermined reference temperature, and is configured to receive the current shift-stage signal of the transmission controller 41, thus applying a d-axis current as the temperature-increasing current to the motor 12 when the shift stage of the vehicle is the P stage.

At this time, if the d-axis current $I_d$ is applied to the motor 12 when the vehicle is stopped (the vehicle is stopped by a P stage gear), the driving torque T of the motor 12 becomes equal to zero according to a torque equation described in the following Equation 1, because a q-axis current $I_q$ is zero.

$$T = \frac{3}{2} P_n (\psi_m I_q + (L_d - L_q) I_d I_q) \quad \text{[Equation 1]}$$

In the above Equation 1, $\Psi_m I_q$ represents torque by a field magnetic flux, and $(L_d-L_q)I_d I_q$ represents torque by reluctance.

Thus, when the vehicle is stopped in the P stage, only the d-axis current $I_d$ is applied to the motor 12 and simultaneously the q-axis current $I_q$ is zero. Hence, the temperature of the motor 12 may rise easily in the state where the driving torque of the motor 12 resulting in the rotation of the motor 12 is not generated.

In other words, in the state where the motor 12 is not rotated by the d-axis current applied to the motor 12, namely, the d-axis current applied to the coil of the stator, heat is generated, so that the temperature of the motor 12 may rise.

Subsequently, as the heat of the motor 12 due to the increase in temperature of the motor 12 is transferred to the oil flowing through an oil circulation passage 12-1 of the motor 12, the temperature of the oil may rise, thereby preventing the viscosity of the oil from increasing in the low temperature environment, and simultaneously maintaining the viscosity of the oil so that the oil may be easily circulated by the electric oil pump.

The driving torque of the motor 12 may be generated due to an error such as a resolver angle of the motor 12. However, since the magnitude of the torque that a parking gear may withstand in the P stage is designed to be three or more times as large as a maximum torque of the motor, it is possible to prevent damage to the parking gear and the movement of the vehicle even if the d-axis current $I_d$ is applied to the motor when the vehicle is stopped in the parking (P) stage.

Due to the momentary torque generation of the motor, shock may occur because a gap exists between parking gear teeth in the P stage, as shown in FIG. 4, when the d-axis current for increasing the temperature is applied to the motor, the controller 40 applies the current to reach a maximum d-axis current value with a predetermined gradient for a predetermined period of time, thus easily preventing a shock phenomenon due to the momentary torque generation of the motor.

The controller 40 may be configured to receive the detection signal of the oil-temperature detector 30, thus applying the temperature-increasing current to the motor 12 when the temperature of the oil is less than the predetermined reference temperature, and to receive the current shift-stage signal of the transmission controller 41, thus selecting an operating point that maximally applies a current in an equal torque line of a current map for driving the motor when the shift stage of the vehicle is the D stage.

The current map is mapping data included in the controller, and is used to control the current (torque) for the motor.

For reference, as shown in FIG. 5, the current map may be formed such that a plurality of equal torque lines $T_1$, $T_2$, ... $T_{max}$ is present in a current limit range (shown by a current limit circle in FIG. 5), and a plurality of operating points at which current applied to the motor is varied is present along each equal torque line.

Maximum Torque Per Ampere (MTPA) in FIG. 5 shows a curve having the maximum torque magnitude per unit current.

Therefore, when the oil temperature is less than the predetermined reference temperature and the shift stage of the vehicle is the D stage, the controller 40 changes the operating point of the motor into an operating point to which the current is maximally applied, in the equal torque line of the current map for driving the motor.

For example, when the controller controls the torque for the motor during the driving of the vehicle, torque may be controlled with an operating point (operating point at which minimum current and maximum torque are generated) present along the MTPA curve. However, as shown by the arrow of FIG. 5, the operating point is changed into an operating point on the equal torque line at which the largest amount of current may be applied, namely, an operating point at which the q-axis current may be reduced but the d-axis current may be increased to the maximum.

Thus, when the oil temperature is less than the predetermined reference temperature and the shift stage of the vehicle is the D stage, the controller 40 changes the operating point of the motor into the operating point to which the current is maximally applied, in the equal torque line of the current map for driving the motor, so that a temperature-increasing current may be further applied to the motor 12. Furthermore, the heat of the motor caused by the increase in temperature of the motor is transferred to the oil flowing through the oil circulation passage 12-1 of the motor, so that the temperature of the oil may rise quickly while the vehicle is driving. Thus, it is possible to prevent the viscosity of the oil from increasing in the low temperature environment, and to simultaneously keep the oil viscosity such that the oil may be easily circulated by the electric oil pump.

Here, an oil temperature increasing method for an eco-friendly vehicle according to the present disclosure will be described in sequence.

FIG. 3 is a flowchart showing the oil temperature increasing method for the eco-friendly vehicle according to an exemplary embodiment of the present disclosure.

First, the oil-temperature detector 30 detects the temperature of the oil that is circulated to the motor 12 and the transmission 13 by the electric oil pump, and then transmits the oil temperature to the controller 40.

Subsequently, the controller 40 checks whether the oil temperature is less than the predetermined reference temperature k, at step S101.

Based on the checked result, when the oil temperature is less than the predetermined reference temperature, the current shift-stage signal of the transmission controller 41 is received, so that the current shift stage is identified, at steps S102 and S103.

When it is identified at step 102 that the current shift stage is the P stage, the controller 40 applies the d-axis current $I_d$ as the temperature-increasing current to the motor 12. To be more specific, the controller applies the current to reach the maximum d-axis current value with a predetermined gradient for a predetermined period of time, at step S104.

As such, when the vehicle is stopped in the P stage, only the d-axis current $I_d$ is applied to the motor 12 and simultaneously the q-axis current $I_q$ is zero, so that the driving torque of the motor that may cause the rotation of the motor is not generated.

Thus, in the state where the motor is not rotated by the d-axis current applied to the motor 12, namely, the d-axis current applied to the coil of the stator, heat is generated, so that the temperature of the motor may rise.

Subsequently, as the heat of the motor due to the increase in temperature of the motor 12 is transferred to the oil flowing through an oil circulation passage 12-1 of the motor 12, the temperature of the oil may rise, thereby preventing the viscosity of the oil from increasing in the low temperature environment, and simultaneously maintaining the viscosity of the oil so that the oil may be easily circulated by the electric oil pump.

After the step of applying the current to reach the maximum d-axis current value, the oil temperature is compared with the reference temperature k at step S108.

Referring to FIG. 6 that shows the test example of the present disclosure, it can be seen that, when the d-axis current 280A is applied to the motor 12 in the P stage, the motor temperature rises from 29° C. to 66° C. and the oil temperature rises from 28° C. to 45° C. This demonstrates that the oil temperature may rise by only applying the d-axis current to the motor 12 in the low temperature environment.

On the other hand, when it is identified that the current shift stage of the vehicle is the D stage at step S103, the controller 40 changes the operating point of the motor 12 into the operating point to which the current is maximally applied, in the equal torque line of the current map for driving the motor 12, at step S105.

As such, the controller 40 changes the operating point of the motor 12 into the operating point to which the current is maximally applied, in the equal torque line of the current map for driving the motor 12, so that a temperature-increasing current may be further applied to the motor 12. Furthermore, the heat of the motor caused by the increase in temperature of the motor is transferred to the oil flowing through the oil circulation passage 12-1 of the motor, so that the temperature of the oil may rise quickly while the vehicle is driving. Thus, it is possible to prevent the viscosity of the oil from increasing in the low temperature environment, and to simultaneously keep the oil viscosity such that the oil may be easily circulated by the electric oil pump.

After the step of increasing the oil temperature, the oil temperature is compared with the reference temperature k at step S106. Here, when it is detected for a predetermined period of time that the oil temperature is equal to or more than the predetermined reference temperature, the controller performs a control operation to stop the step of applying the temperature-increasing current to the motor at step S107.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. An oil temperature increasing system for an eco-friendly vehicle, the system comprising:
   an oil-temperature detector configured to detect a temperature of oil flowing to a motor and a transmission by an electric oil pump; and
   a controller configured to:
      receive a detection signal of the oil-temperature detector,
      apply a current for increasing temperature to the motor when the oil temperature is less than a predetermined reference temperature,
      apply the current for increasing temperature as a d-axis current to the motor when a shift stage of the vehicle is a Parking (P) stage, and
      apply the current for increasing temperature to the motor and to select an operating point that maximally applies the current in an equal torque line of a current map for driving the motor when a shift stage of the vehicle is a Drive (D) stage,
   wherein a temperature of the motor is increased by the current applied to the motor, such that the oil temperature is increased by heat of the motor.

2. The oil temperature increasing system of claim 1, wherein the controller applies the d-axis current to the motor for increasing temperature to reach a maximum d-axis current value with a predetermined gradient for a predetermined period of time.

3. The oil temperature increasing system of claim 1, wherein, when the oil temperature equal to or more than the predetermined reference temperature is detected after applying the current to the motor, the controller stops applying the current to the motor.

4. The oil temperature increasing system of claim 1, wherein the controller is configured to apply the current for increasing temperature as the d axis current only to the motor when a shift stage of the vehicle is a Parking (P) stage.

5. An oil temperature increasing method for an eco-friendly vehicle, the method comprising:

detecting, by an oil-temperature detector, a temperature of oil flowing to a motor and a transmission by an electric oil pump; and applying, by a controller, a current for increasing temperature to the motor, when a detection signal of the oil-temperature detector is received and the oil temperature is less than a predetermined reference temperature, wherein, the controller applies the current as a d-axis current to the motor when a shift stage of the vehicle is a Parking (P) stage, and when a shift stage of the vehicle is a Drive (D) stage, the controller selects an operating point at which the current is maximally applied in an equal torque line of a current map for driving the motor, wherein the temperature of oil is increased by heat of the motor as a temperature of the motor is increased by applying the current to the motor.

6. The oil temperature increasing method of claim 5, wherein the d-axis current is applied to the motor to reach a maximum d-axis current value with a predetermined gradient for a predetermined period of time.

7. The oil temperature increasing method of claim 5, wherein, when the oil temperature equal to or more than the predetermined reference temperature is detected after applying the current for increasing temperature to the motor, the controller stops applying the current to the motor.

* * * * *